United States Patent [19]
Benjey et al.

[11] Patent Number: 6,062,276
[45] Date of Patent: *May 16, 2000

[54] TWO-STAGE ORVR CONTROL VALVE

[75] Inventors: Robert P. Benjey, Dexter; Rudolph Bergsma, Ann Arbor, both of Mich.

[73] Assignee: G.T. Products, Inc., Ann Arbor, Mich.

[ * ] Notice: This patent is subject to a terminal disclaimer.

[21] Appl. No.: 09/139,805

[22] Filed: Aug. 25, 1998

Related U.S. Application Data

[63] Continuation of application No. 08/769,166, Dec. 18, 1996, Pat. No. 5,860,458, which is a continuation of application No. 08/295,196, Aug. 24, 1994, Pat. No. 5,590,697.

[51] Int. Cl.[7] ................................................. F16K 17/04
[52] U.S. Cl. ........................ 141/198; 141/59; 137/43; 137/202
[58] Field of Search ................................. 141/44–46, 52, 141/53, 59, 128, 192, 198, 302–304; 137/43, 202, 587; 220/86.2, 86.3

[56] References Cited

U.S. PATENT DOCUMENTS

| | | |
|---|---|---|
| 4,699,638 | 10/1987 | Harris . |
| 4,756,328 | 7/1988 | Sherwood . |
| 4,953,583 | 9/1990 | Szlaga . |
| 5,014,742 | 5/1991 | Covert et al. . |
| 5,028,244 | 7/1991 | Szlaga ........................................ 55/170 |
| 5,044,389 | 9/1991 | Gimby ....................................... 137/39 |
| 5,215,132 | 6/1993 | Kobayashi . |
| 5,678,590 | 10/1997 | Kasugai et al. . |

FOREIGN PATENT DOCUMENTS

| | | |
|---|---|---|
| 7-127540 | 5/1995 | Japan . |
| 7-280117 | 10/1995 | Japan . |

OTHER PUBLICATIONS

European Search Report Aug. 5, 1998.

*Primary Examiner*—J. Casimer Jacyna
*Attorney, Agent, or Firm*—Young & Basile, P.C.

[57] ABSTRACT

A refueling fuel level responsive control valve with a two-stage closing operation providing an initial soft shutoff cue to the filler nozzle operator, and a subsequent final shutoff after a limited amount of "roundoff" filling to a maximum fuel level. The control valve includes two float-operated valve elements which close serially in response to initial shutoff and final shutoff refueling fuel levels. The initial shutoff partially closes the control valve to create a temporary shutoff-inducing increase in fuel tank pressure. Final shutoff occurs after allowing a few round-off "clicks" of the filler nozzle to fully close venting through the control valve.

17 Claims, 4 Drawing Sheets

TWO-STAGE ORVR CONTROL VALVE

This application is a continuation application of U.S. Ser. No. 08/769,166 filed Dec. 18, 1996 (now U.S. Pat. No. 5,860,458 issued Jan. 19, 1999), which is a continuation of U.S. Ser. No. 08/295,196 filed Aug. 24, 1994 (now U.S. Pat. No. 5,590,697 issued Jan. 7, 1997).

FIELD OF THE INVENTION

The present invention relates generally to control valves for "onboard" type fuel vapor recovery systems for vehicle fuel tanks, wherein fuel vapor generated during the refueling process is vented to onboard vapor recovery apparatus such as a carbon canister.

BACKGROUND OF THE INVENTION

Systems for controlling the flow of fuel vapor from a vehicle fuel tank to a recovery apparatus such as a carbon canister are generally known. A common approach is to place a control valve in series between the fuel tank and the vapor trap to selectively open and close the vapor venting pathway in response to changes in vehicle refueling activity.

Some known vapor control valves open or close in response to pressure conditions at the filler pipe inlet, for example when a filler pipe cap is removed or replaced to indicate the start or finish of refueling operations.

Other pressure-operated control valves respond to vapor pressure in the fuel tank itself to open, close, or adjust the rate at which fuel vapor is vented.

Another known type of valve responds to the level of liquid fuel in the tank, staying open to vent vapor as long as the fuel level is below a predetermined level. These are sometimes referred to as "fill control" or "shutoff" valves, since their closing creates a sudden pressure increase in the tank which prevents further refueling.

Prior vapor recovery systems often use pressure-operated control valves, sometimes supplemented with rollover and/or fill control valves to supplement the pressure operated vapor control. Disadvantages of such pressure-operated systems include their relative complexity and cost; their sensitivity to changing pressure conditions in the fuel system; and, the need for vapor seal and/or signal structure in the filler pipe, for example filler nozzle trap doors and signal pressure lines to prevent the loss of fuel vapor to the atmosphere during refueling and/or to provide signal or actuation pressure to the control valve.

One known technique for eliminating filler nozzle trap door or other seal structure in the filler pipe is to create a "dynamic" seal in the pipe using only the flow effects of a high velocity stream of fuel from the filler nozzle. By properly shaping the filler pipe in the region where the filler nozzle is located during refueling, and pumping the fuel at high velocity, a vacuum or draw-type seal can be created and maintained around the filler nozzle during refueling. This eliminates the need for seal door and similar structure. However, many pressure-operated control valves cannot function without such structure in the filler pipe. The dynamic sealing generates higher refueling pressure in the tank, tending to cause undesirable fuel expulsion or "spitback" from the filler pipe inlet at the end of the refueling operation. The prior art has not adequately addressed the need for an onboard vapor recovery system suitable for high pressure refueling with a dynamic filler pipe seal.

SUMMARY OF THE INVENTION

The present invention is a refueling fuel level responsive control valve comprising a two-stage shutoff valve with a cushioned, "soft" initial shutoff especially suited for high-pressure refueling operations, for example with dynamically sealed filler pipes, but useful generally for refueling-operated shutoff in a vehicle fuel tank. The inventive control valve is adapted for venting fuel vapor from the fuel tank to a vapor recovery apparatus at a first higher rate when the fuel level is below an initial refueling shutoff level; at a second lower rate when the fuel level reaches the initial shutoff level, such that a shutoff-inducing pressure increase is temporarily created in the tank for a "soft" shutoff; and for closing when a maximum refueling shutoff level is reached. This is achieved in a particular embodiment with a two-stage valve closing structure responsive to the level of liquid fuel in the tank, wherein primary and secondary valve elements operated by a float first partially close, and then fully close, the control valve.

DETAILED DESCRIPTION OF THE DRAWINGS

Figure 1:
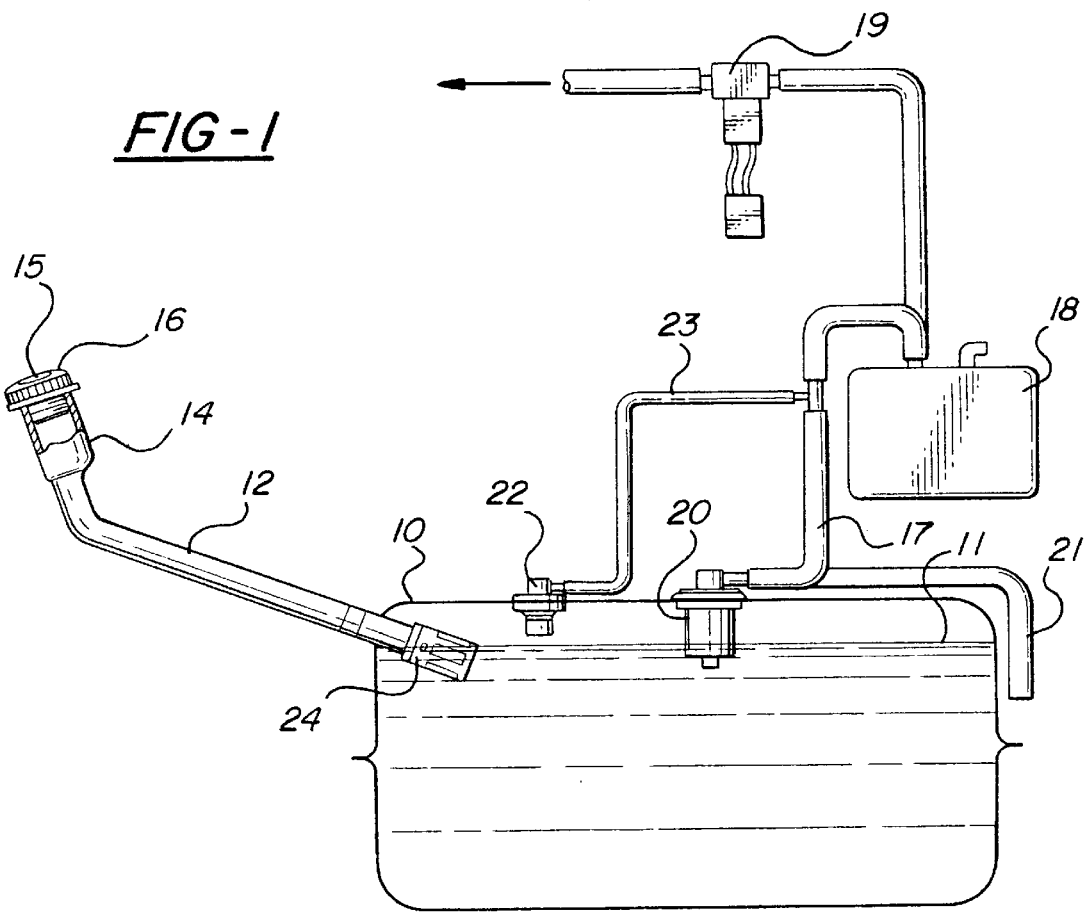
FIG. 1 is a schematic illustration of a vehicle fuel system with an onboard vapor recovery system according to the present invention.
Figure 6:
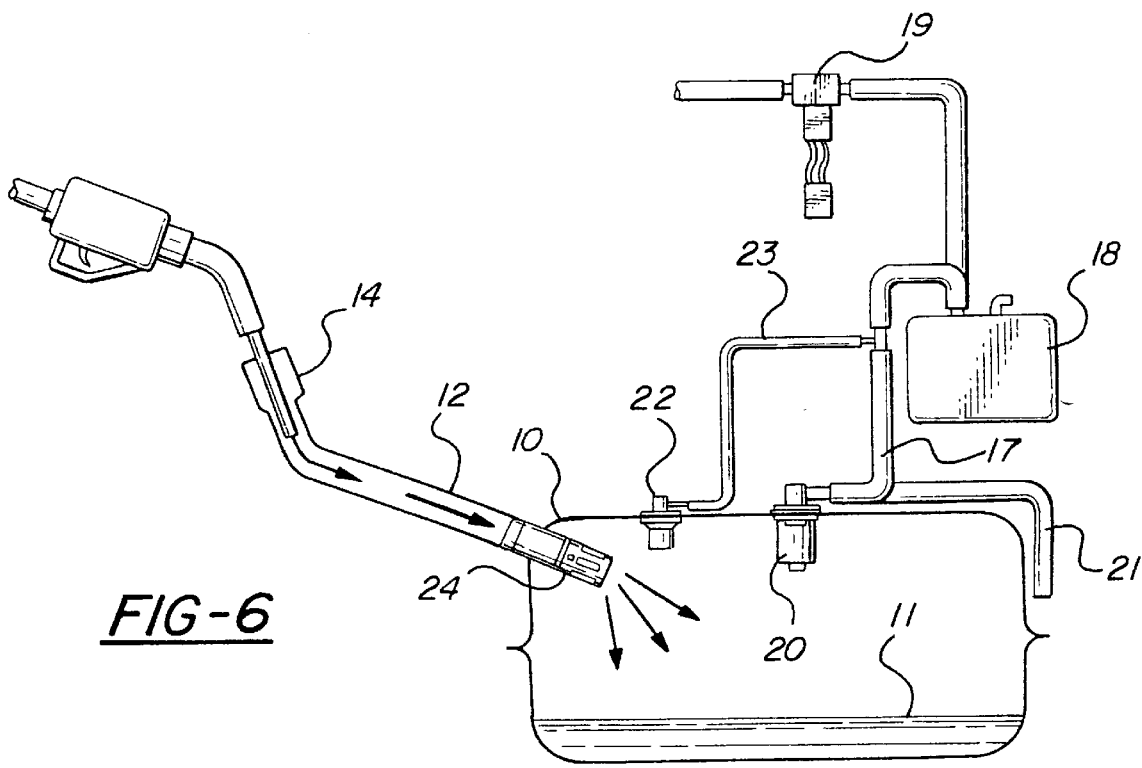
FIG. 6 illustrates the system of FIG. 1 during a refueling operation.

Referring now to FIG. 1, an onboard vapor recovery system according to the present invention is shown for a vehicle fuel system comprising a tank 10, a filler pipe 12 with an inlet 14 selectively closed by cap 16, and a vapor canister 18 connected to tank 10 by a vent line 17. The filler pipe in the inventive system is configured to create a dynamic seal with a filler nozzle during refueling; i.e., fuel pumped at high velocity from the filler nozzle into the filler pipe creates a vacuum-type seal adjacent the filler nozzle outlet to prevent the escape of fuel vapor out the filler pipe inlet. In the illustrated embodiment the dynamic seal results in fuel being introduced into the tank at a pressure head of approximately eighteen to twenty inches of water pressure. Prior systems without dynamic sealing often operate at refueling pressures of around seven to ten inches.

Fuel vapor from tank 10 is vented through line 17 to canister 18, where it is adsorbed and periodically purged to the engine for combustion. Fuel vapor venting from tank 10 via line 17 to canister 18 is through a fuel level responsive control valve 20, mounted in a suitable aperture in the fuel tank to be closed by liquid fuel at or above a predetermined level shown at 11. When the liquid fuel in tank 10 is below that predetermined level, valve 20 remains open to vent fuel vapor to canister 18.

In the illustrated embodiment control valve 20 substantially reduces, but does not abruptly halt, vapor venting from the tank to the vapor canister when an approximate full fuel level is reached. Instead, valve 20 provides a limited amount of additional, low volume vapor venting between a first full level and a slightly higher maximum "round off" level. This results in an initial "soft" shutoff at the first full level to prevent overly rapid backup of fuel in the filler pipe and possible spitback onto the person operating the filler nozzle. When the initial shutoff occurs, the resulting rise in tank pressure forces fuel back up the filler pipe to cover the mouth of the filler nozzle, activating an internal shutoff mechanism in the filler nozzle in known manner. After a short time the fuel standing in the filler pipe drains back into the tank. If the nozzle operator continues to fill the tank after being cued by the initial shutoff, the valve closes at the maximum level to trigger a final shutoff and end the refueling activity.

The illustrated system also includes a rollover-type head valve 22, in the illustrated embodiment of FIG. 1 a separate valve 22 mounted in the fuel tank to vent fuel vapor to canister 18 through line 23. Rollover head valve 22 is designed to maintain a sufficient pressure head in the vapor space of the fuel tank after valve 20 has closed for fuel to accumulate in the filler pipe for nozzle shutoff. For example, head valve 22 maintains approximately twenty inches of water pressure. Below this pressure rollover head valve 22 remains closed; above this pressure rollover head valve 22 opens to rapidly vent fuel vapor to canister 18. In the illustrated embodiment of FIG. 1, rollover head valve 22 includes a small bleed orifice or vent, for example on the order of 0.020 inches diameter, to provide a low volume, continuous vent from the fuel tank to the canister. As described below, the bleed in valve 22 provides sufficient head valve function on its own if pressure reduction after fill occurs within a reasonable time.

Still referring to FIG. 1, the illustrated system also includes a one way, low back pressure, liquid seal check valve 24 in the lower end of the filler pipe at or below the full fuel level. High velocity fuel introduced from the upper end of the filler pipe during refueling forces check valve 24 open to fill the fuel tank. When control valve 20 closes to seal the tank and refueling ceases, check valve 24 positively closes against the pressurized fuel in the tank to prevent it from being expelled out the filler pipe.

The one way nature of check valve 24 prevents its being forced open for reverse fluid flow from the tank to the filler pipe.

Vacuum relief for the fuel tank is provided by suitable vacuum relief structure 15 in cap 16 of a known type, acting in series with check valve 24. For example, if negative pressure conditions occur in the vapor space in tank 10, the pressure imbalance across check valve 24 will cause it to open, relieving the tank with pressure stored in filler pipe 12. If this residual pressure is not enough to relieve the tank vacuum, the vacuum relief valve structure 15 in cap 16 will additionally open to provide atmospheric relief pressure through pipe 12 and check valve 24 to the tank. This arrangement complements the inherent vacuum relief structure in either of valves 20 or 22. The bleed in valve 22 may provide some vacuum relief prior to relief through cap 16; and vacuum relief can sometimes occur across the float structure in valve 20, which can be forced downwardly against liquid fuel if the vacuum pressure differential across it is high enough.

FIG. 1 illustrates the vehicle fuel system immediately after the tank has been filled to the maximum level and refueling has ceased. In this condition control valve 20 is closed, rollover head valve 22 is closed (assuming a pressure head in tank 10 at or below the pressure relief level of the rollover head valve), and check valve 24 is closed. A column of liquid fuel (not shown) may remain standing in the filler pipe above the check valve. Except for the low volume bleed vent in rollover head valve 22, the entire system is closed.

The low volume bleed vent in rollover head valve 22 dissipates the closed system pressure to the canister, maintaining the pressure head for a short time (for example, less than one minute) after the check valve 24 and shutoff valve 20 have closed. Temporarily maintaining the closed system pressure head in this manner discourages attempts at overfilling for a reasonable period, and then allows tank pressure to decay so that standing fuel in the filler pipe can drain into the tank and overall system pressure is reduced.

Should tank pressure increase in this closed system condition beyond the capacity of the bleed vent, for example if the vehicle is left parked with the tank at maximum fuel level and at high temperature, the rollover head valve 22 opens for rapid venting until the excess pressure is relieved. In this extreme case, the tank pressure will not significantly exceed the twenty-inch head maintained by the head valve, although some hysteresis in pressure reduction may initially occur depending on the exact rollover structure used.

It should be noted that the check valve 24 will remain closed by the spring and the high fuel level if the cap is removed, preventing fuel expulsion. If the vehicle is driven in this closed-system condition, fuel sloshing will intermittently open shutoff valve 20, which will rapidly reduce tank pressure.

A vent line 21 from valve 20 to the atmosphere provides emergency pressure relief in a manner described below in reference to FIG. 2.

The control valve 20 of the present invention is open both during refueling and normal vehicle operation, so long as the fuel level in the tank is below the maximum (i.e., reopening) level, which those skilled in the art will recognize as varying slightly as the result of different tank pressures and the effects of hysteresis. Vapor is accordingly vented to the canister 18 on a relatively continuous basis. To prevent saturation of the canister with fuel vapor, an electronic purge solenoid 19 is connected downstream from the canister to periodically allow vacuum from the vehicle intake manifold to "purge" vapor from the canister to the engine.

It can be seen from the foregoing that the fuel level responsive control valve 20, head valve 22 and check valve 24 provide complementary vapor recovery, shutoff and spitback-prevention in a manner uniquely coordinated for high pressure refueling with a dynamically-sealed filler pipe. Fuel level responsive valve 20 is unaffected by pressure extremes and vents freely until the tank is filled, at which point its cushioned shutoff provides a first level of spitback protection against the high pressure refueling. Head valve 22 maintains the high pressure head needed in the tank to provide a shutoff-inducing back pressure after valve 20 has closed, at least long enough to discourage overfilling attempts, and then reduces overall pressure with a controlled bleed. Check valve 24 provides an immediate, reliable check against spitback from the tank pressure accumulated for the shutoff function. Check valve 24 also maintains a back pressure low enough to avoid premature shutoff of the filler nozzle.

Figure 2:
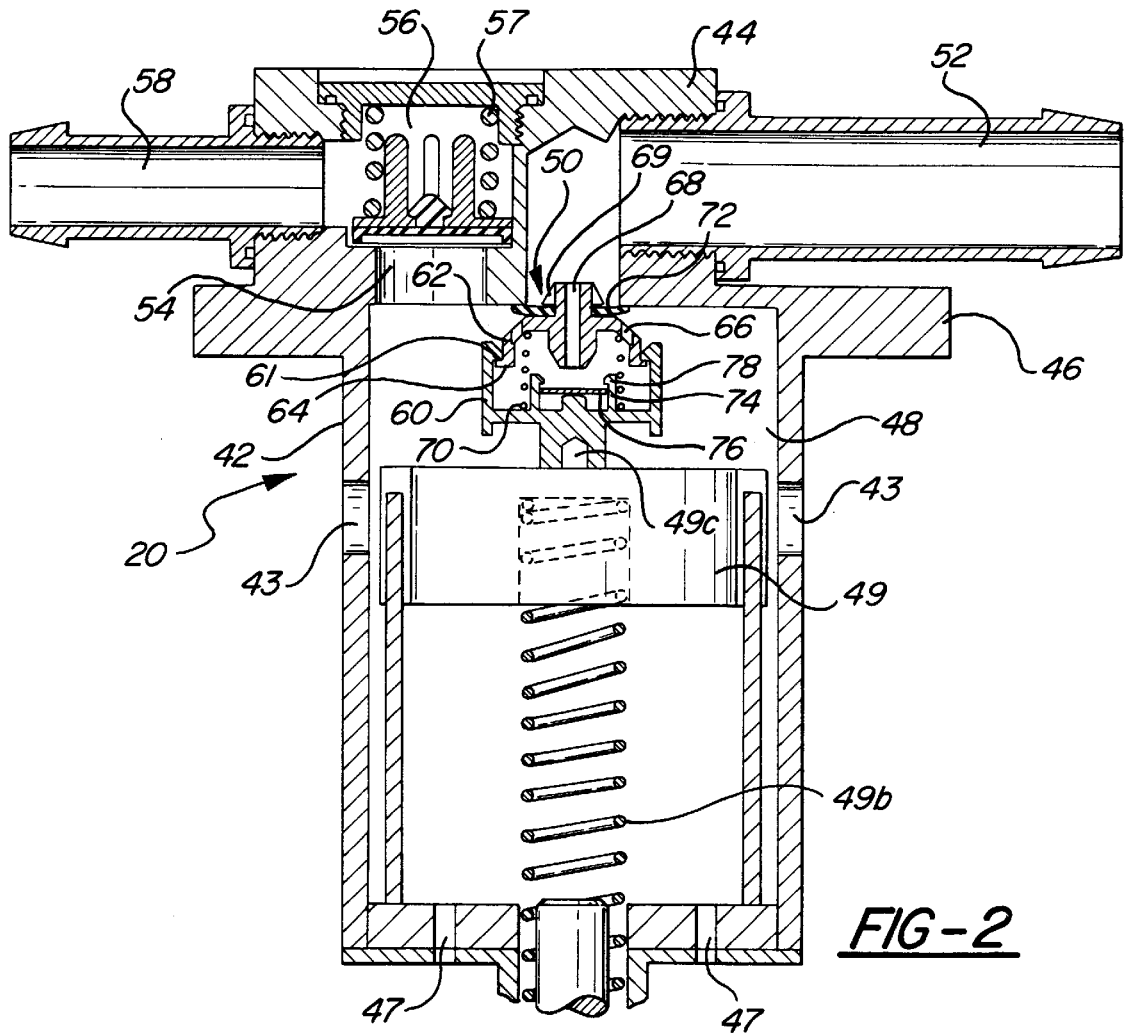
FIG. 2 is a section view of a fuel level responsive control valve employed in the system of FIG. 1.

Referring now to FIG. 2, a first embodiment of a shutoff type control valve suitable for the system of FIG. 1 is illustrated. Valve 20 comprises an essentially hollow valve body mounted in a suitable aperture in the fuel tank. Lower half 42 of the valve is located in the interior of the fuel tank, and communicates with an upper half 44 outside the fuel tank. The valve is fastened to the fuel tank in liquid- and vaportight manner by connector flange 46, for example by hot plate welding, ultrasonic welding, grommet-type seal or other known techniques.

Lower half 42 of valve 20 defines a float chamber 48 open at its lower end to receive liquid fuel as the fuel level in the tank rises to the full level. Radial vent ports 43 and holes 47 in the bottom end of lower half 42 provide vapor and liquid communication between tank 10 and float chamber 48. At its upper end float chamber 48 includes a primary vent port 50 opening into the upper half 44 of the valve and communicating with an outlet 52 connected by conduit or hose 17 (FIG. 1) to vapor canister 18.

Valve 20 can be provided with baffle structure (not shown) associated with vent ports 43 in chamber 48, to prevent liquid fuel from splashing through vent ports 43 to port 50.

Chamber 48 also includes a pressure relief port 54 at its upper end, opened and closed by spring-biased pressure relief valve 56 to selectively vent chamber 48 to a pressure relief outlet 58 connected to the atmosphere (by line 21 in FIG. 1).

A fuel level responsive float 49 is contained in chamber 48 for up and down movement on guide pins 49a as the float chamber fills with liquid fuel through holes 47 and vents 43. The density of float 49 is balanced relative to that of the fuel, for example with a spring 49b, such that it closes when immersed in liquid fuel in both upright and rollover situations. Float 49 may have a density less than, equal to, or greater than that of the fuel, balanced by spring 49b as desired for fill control and rollover function.

Figure 2A:
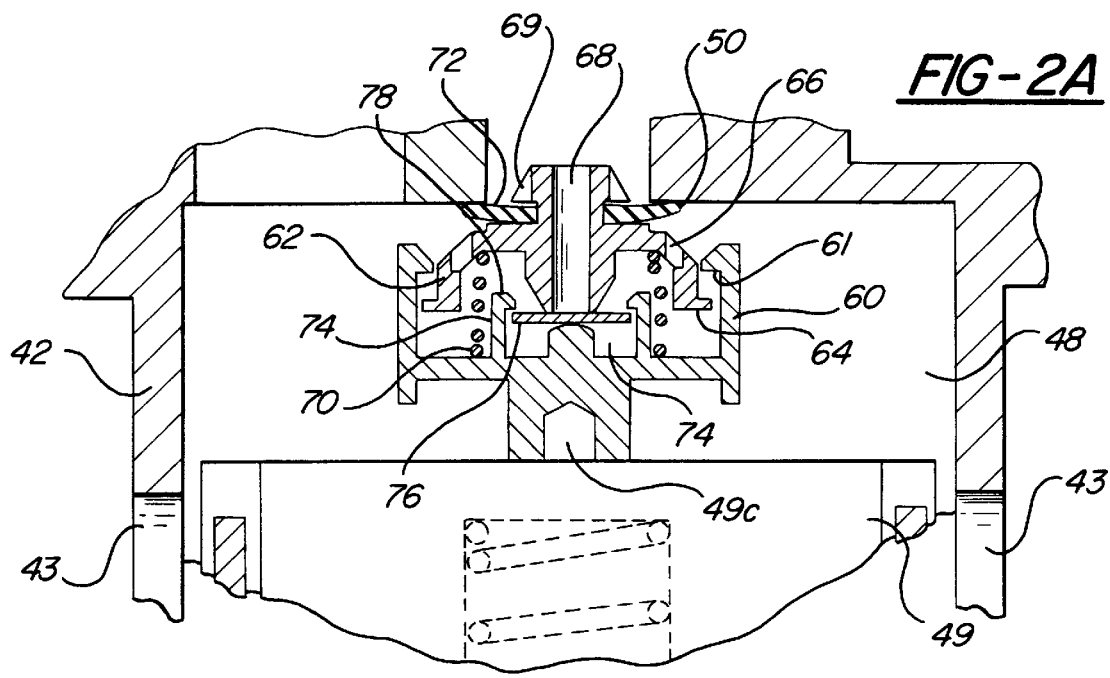
FIG. 2A illustrates the valve of FIG. 2 in a fully closed condition.

Referring to FIGS. 2 and 2A, the upper end of float 49 is connected by spindle 49c to a first valve cage 60 defining a cylindrical cup containing a primary shutoff valve element 62. Primary valve element 62 is axially trapped in cage 60 by interference between its shoulder 64 with lip 61 on cage 60. Valve element 62 includes a number of vent apertures 66 which allow vapor communication between float chamber 48 and the interior of valve cage 60. Valve element 62 also includes a central vent passageway 68 aligned with vent port 50. Primary valve element 62 is normally forced against lip 61 at the upper end of cage 60 by a spring 70. Valve element 62 supports a sealing member 72 at its upper end, for example a resilient rubber-like disc retained by an angled collar 69.

A second valve cage 74 is formed inside valve cage 60, containing a secondary valve disk 76. Valve cage 74 comprises a plurality of actuation fingers 78 of varying height around the periphery of valve disk 76. Valve disk 76 is free to move axially within cage 74 between the upper ends of fingers 78 and a centering bead. Second valve cage 74 and secondary valve 76 can comprise, for example, peeling action valve structure of the type shown and described in U.S. Pat. No. 4,753,262 to R. Bergsma, co-owned by the assignee of this application.

In operation, float 49 and the primary and secondary valve elements 62,76 remain in a lower position in float chamber 48 away from primary vent port 50 whenever the fuel level is below a predetermined level.

When the fuel reaches a predetermined near-full level, float 49 rises in chamber 48, forcing seal 72 on primary valve element 62 against the primary vent port 50. This closes primary vent port 50, but leaves open the lower volume venting from chamber 48 through valve cage 60 via apertures 66 and passageway 68 in valve 62. The result is a significant reduction in the rate of vapor venting, causing a rapid but controlled rise in the tank head pressure. This in turn forces fuel back up the filler pipe at a controlled rate, actuating the filler nozzle mechanism for an initial "soft" shutoff without spitback onto the operator.

The initial shutoff is a cue to the operator that the tank is close to full. At this point primary valve 62 is in the position shown in FIG. 2, above valve disk 76 resting in cage 74, held in place by the force of spring 70.

After the initial soft shutoff and the shutoff-inducing rise in tank pressure, vapor pressure in the tank is dissipated fairly quickly, for example in a few seconds, through the secondary vent path defined by apertures 66 and passageway 68. This allows the fuel backed up in the filler pipe to drain into the tank. As a result, a small amount of additional fuel can be added to round off the tank by "clicking" the filler nozzle operating handle.

If the nozzle operator should choose to add fuel after the initial shutoff, float 49, cage 60 and cage 74 are forced upwardly by the rising fuel against spring 70 until valve disk 76 contacts and closes off central passageway 68 in valve 62 as shown in FIG. 2a. This completely closes venting from the fuel tank through valve 20 to canister 18, and results in a final shutoff cue to the operator of the filler nozzle. Should the operator ignore these shutoff indicatinos and unwisely persist in trying to add fuel beyond the initial shutoff and the few round-off "clicks" allowed before final shutoff cue, and somehow override or circumvent the filler nozzle shutoff mechanism, the fuel will simply back out the filler pipe inlet.

The two-stage soft shutoff with its cushioned initial shutoff and controlled round-off allowance can be adjusted as desired through the relative sizing of the primary and secondary vent ports or passages, spring forces, the relative height of the first and second valves controlling the amount of round-off, and in other ways which will be apparent to those skilled in the art. In the illustrated embodiment the primary and secondary valve elements 62,76 are calibrated to permit three or four clicks of round-off before completely closing the valve.

Valve 20 remains fully closed until the level of liquid fuel in the tank drops, with valve disk 76 first being peeled off passageway 68 by fingers 78 as float 49 drops, followed by valve 62 being pulled from vent port 50 by valve cage 60 as the float drops further.

Pressure relief valve 56, located above the maximum fuel level, is forced open against spring 57 when vapor pressure in the tank exceeds a predetermined safe level, for example sixty inches water pressure. Valve 56 would then open to reduce tank pressure to a safe level. The infrequency and nature of emergency pressure venting warrants venting valve 56 to the atmosphere for immediate pressure reduction.

Figure 3:
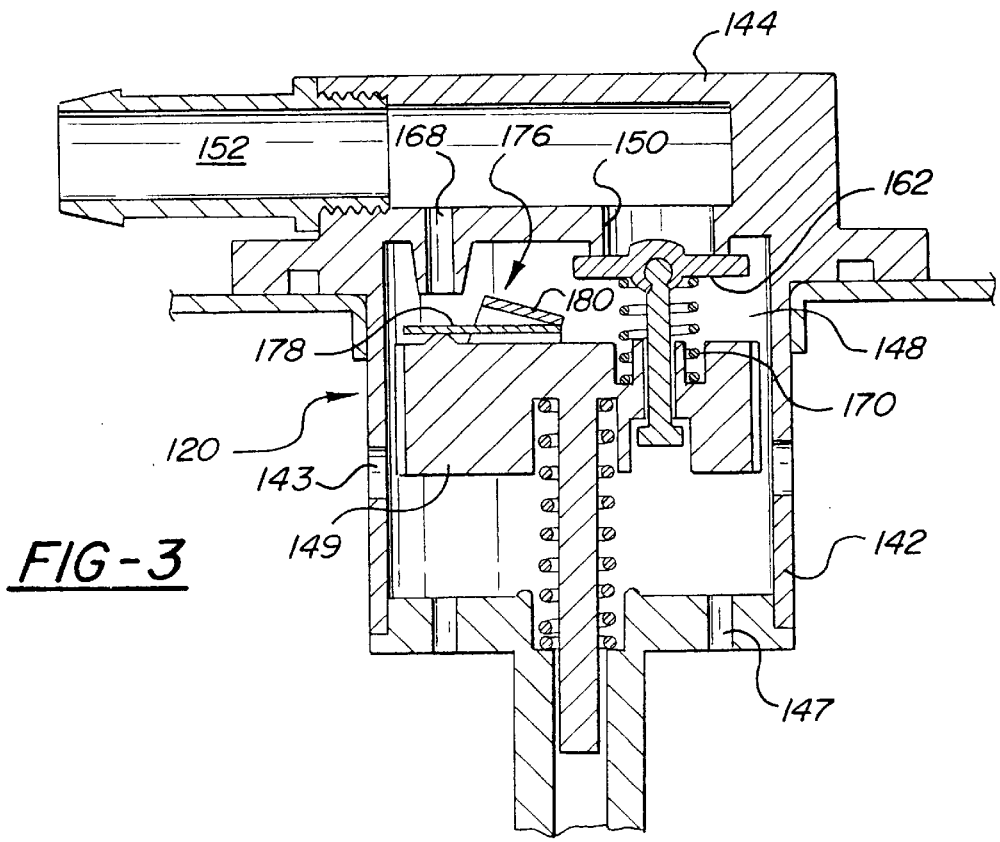
FIGS. 3 and 3A are section views of an alternate control valve for use in the system of FIG. 1.
Figure 3A:
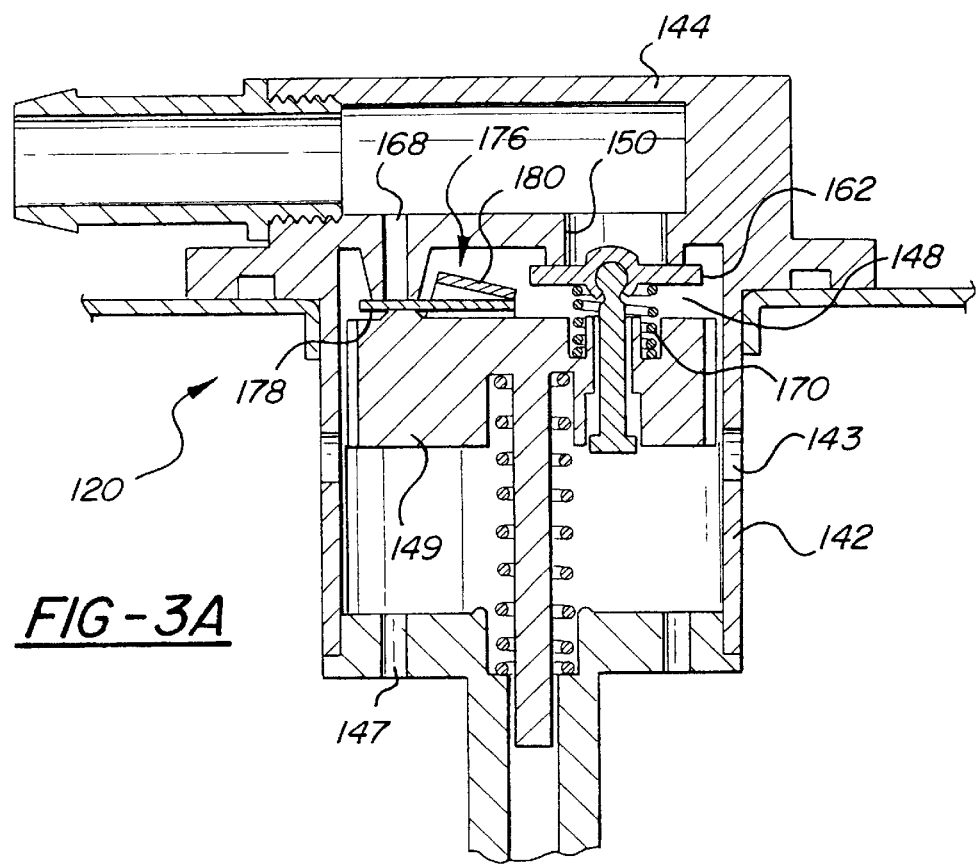

FIGS. 3 and 3A illustrate an alternate two-stage soft shutoff valve 120 suitable for the system of FIG. 1. Its operation is similar to that of the valve in FIG. 2, but the primary and secondary valves are radially offset, rather than coaxially arranged.

In FIG. 3 a primary vent port 150 and a secondary vent passage 168 are radially spaced from one another at the upper end of float chamber 148. Vents 150, 168 vent vapor from the tank to the upper half 144 of valve 120, where it passes to a vapor trap through outlet 152. Spring balanced float 149 supports a primary valve 162 for closing primary vent 150, and a secondary valve 176 for closing passageway 168. Primary valve 162 is normally positioned higher than valve 176 by bias spring 170.

Secondary valve 176 may, for example, be the peel-away type illustrated in U.S. Pat. No. 5,313,977 to Bergsma et al, co-owned by the assignee of the present application, including a valve element 178 and peel-away structure 180.

Float 149 and valves 162,176 remain below the vent ports 150,168 as long as liquid fuel is below the full or near-full level. When fuel in float chamber 148 reaches the predetermined "soft" shutoff level through radial and/or axial ports 143, 147 in lower half 142, float 149 is forced upwardly to initially close primary vent port 150 with valve 162. This initiates the initial soft shutoff described above. If the operator adds additional fuel by clicking the filler nozzle, float 149 is lifted further against spring 170 until second valve 176 contacts and closes off the secondary passageway 168 as shown in FIG. 3A. This finalizes the shutoff of control valve 120 in the manner described above in FIG. 2.

Valve 120 opens in a manner similar to valve 20 described in FIG. 2; i.e., valve 176 is first peeled off passageway 168 by the descending float, followed by valve 162 being pulled away from primary vent outlet 150 as the fuel level drops further. It will be apparent to those skilled in the art that, despite the different structure, valve 120 in FIG. 3 achieves a two-stage soft shutoff similar to that of valve 20 in FIG. 2. It is therefore suitable for use with the system of FIG. 1 in place of valve 20.

Figure 4:
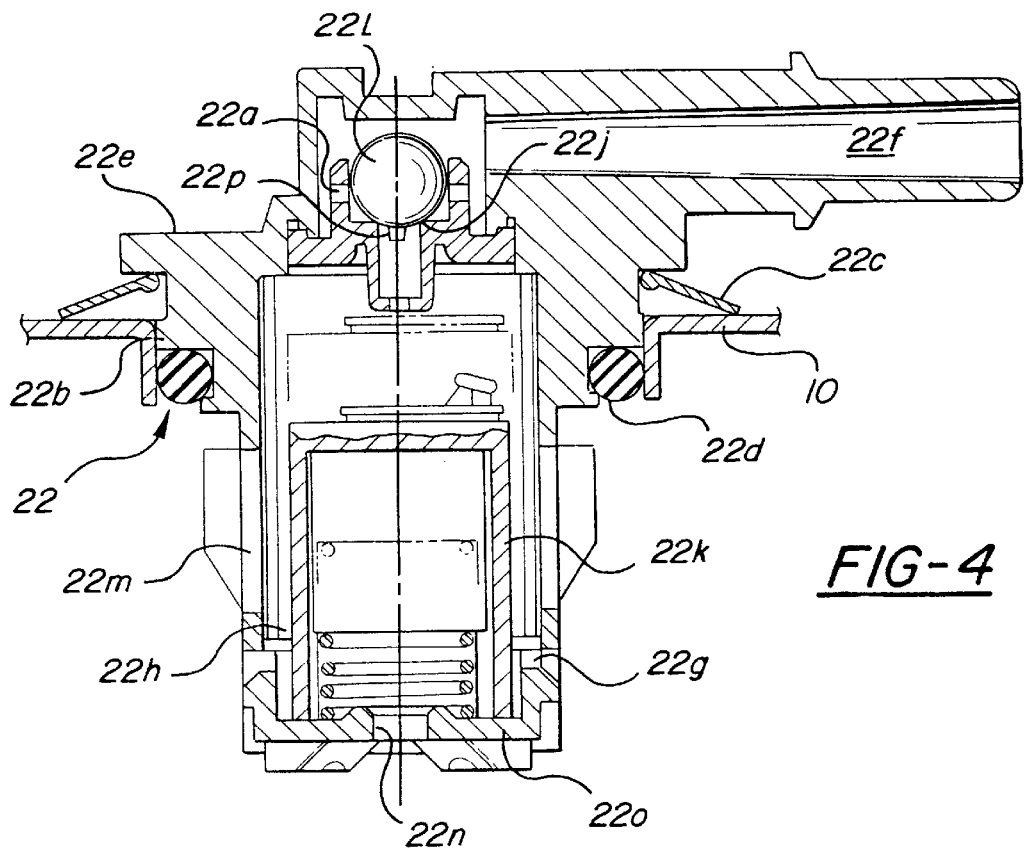
FIG. 4 is a section view of a rollover valve for use with the system of FIG. 1.

FIG. 4 illustrates one embodiment of a rollover-type head valve 22 suitable for use in the system of FIG. 1. Rollover head valve 22 comprises an essentially hollow body mounted to the fuel tank 10 through a suitable aperture via a shoulder portion 22b and resilient seal members 22c and 22d. Rollover head valve 22 has an upper half 22e located outside the tank and including an outlet 22f connected to the vapor canister as shown in FIG. 1 by suitable hose or conduit connection. A lower half 22g of the rollover head valve extends into the fuel tank, and includes a rollover float chamber 22h. At its upper end float chamber 22h communicates with outlet 22f by way of a rollover vent outlet 22i and a head valve vent outlet 22j. Rollover vent outlet 22i is selectively closed by a spring balanced rollover float valve 22k held in float chamber 22h, and head valve vent outlet 22j is normally closed by a ball-type head valve 22l. Float chamber 22h includes a number of radial vent ports 22m through which fuel vapor from the tank can enter float chamber 22h and pass through vent outlets 22i,22j to rollover head valve outlet 22f and the vapor canister. Float chamber 22h also includes a hole 22n in its end plate 22o through which liquid fuel enters the float chamber to raise float 22k when the liquid level in the tank rises to the level of rollover head valve 22.

Further explanation of the structure and operation of a rollover valve similar to 22k and a head valve similar to 22l is found in U.S. Pat. Nos. 5,313,977 to Bergsma et al and 5,253,668 to Mills, respectively, both co-owned by the assignee of this application.

FIG. 4 illustrates rollover head valve 22 in its normally closed condition for an upright vehicle orientation. The level of liquid fuel in the tank, even at maximum, remains below the level of rollover head valve 22, leaving rollover float valve 22k in the lowered position away from rollover vent outlet 22i. However, ball head valve 22l is calibrated to maintain a pressure head in the fuel tank higher than the pressure at which fuel is introduced into the tank during refueling once the shutoff control valve 20 has closed. Ball head valve 22l accordingly remains in the closed position shown in solid lines in FIG. 4 in which the head valve vent outlet 22j is blocked by the ball valve element.

Rollover head valve 22 also includes a small bleed vent 22p, illustratively associated with the ball head valve outlet 22j, to provide a continuous, low volume vent from the fuel tank to the canister through rollover head valve 22 even in the valve closed condition of FIG. 4. Bleed vent 22p is calibrated to gradually reduce the pressure head maintained in the fuel tank after the control valve has closed, preferably for a sufficient time to deter further refueling attempts once the final shutoff has occurred as described above. In the illustrative embodiment bleed vent 22p is on the order of 0.020 inches in diameter, and temporarily maintains a refuel-preventing pressure head in the tank after refueling has ceased.

Still referring to FIG. 4, head valve 22l opens as shown in phantom to permit high volume venting of fuel vapor from the tank to the canister through radial vents 22q in the ball-containing nest or cup when the desired pressure head in the tank is exceeded.

Should the vehicle enter a rollover orientation, or if fuel slosh or overfill levels rise to rollover head valve 22, rollover float valve 22k is forced against rollover vent outlet 22i as shown in phantom to completely close the valve and prevent liquid fuel from leaking to the canister.

Figures 5, 5A:
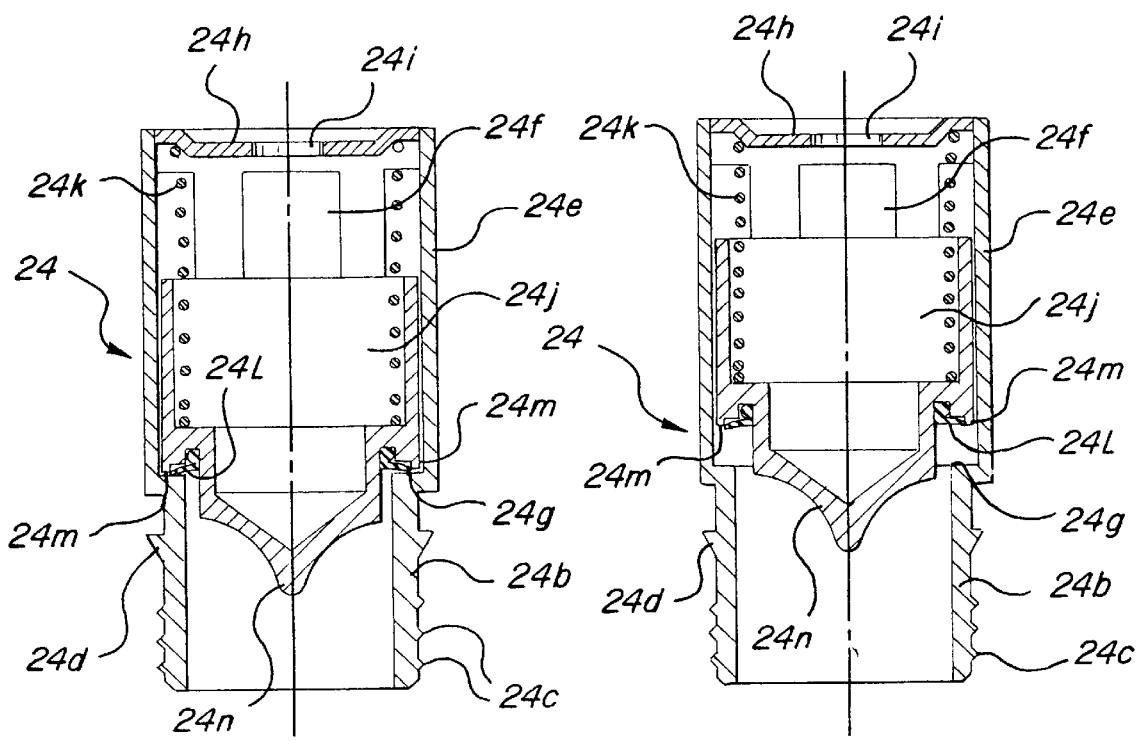
FIG. 5 is a section view of a liquid seal check valve for use in the filler pipe of FIG. 1.
FIG. 5A illustrates the check valve of FIG. 5 in an open condition.

Referring now to FIG. 5, a first illustrative embodiment of a check valve 24 is illustrated for use with the system of FIG. 1. It comprises a hollow body having an upper cylindrical plug portion 24b inserted in the lower end of the filler pipe in a sealing, snap-retention fit. Upper plug portion 24b is provided about its circumference with seal beads 24c and a retention flange 24d for that purpose. Check valve 24 further includes a hollow, cylindrical lower valve chamber 24e with a number of radial vent ports 24f formed about its periphery. The junction of plug portion 24b and valve chamber 24e forms a valve seat 24g. The lower end of valve chamber 24e is closed by an end plate 24h with a central hole 24i. A piston-like hollow valve element 24j is located in valve chamber 24e for axial movement between valve seat 24g and end plate 24h. The diameter of valve element 24j is less than the interior dimensions of the valve chamber, such that liquid fuel from the filler pipe flows through plug portion 24b, across valve seat 24g, around valve element 24j, through radial vents 24f, and into the fuel tank. Valve element 24j is normally biased against valve seat 24g by spring 24k to close the check valve. A resilient seal member 24l seals against valve seat 24g in the closed position, protected from cutting or shearing by a raised shoulder 24m on the valve element radially exterior of seal 24l. The upper end of valve element 24j is formed as a rounded, conical flow pilot 24n which projects into plug portion 24b past seat 24g to direct fuel flow around the sides of valve element 24j.

Check valve 24 is a one way, positive closing valve which opens to admit fuel from the filler pipe into the fuel tank, but which positively closes as soon as the refueling operation terminates and/or the pressure in the fuel tank is equal to or greater than the pressure or weight of fuel in the filler pipe. In FIG. 5 check valve 24 is shown in the closed condition, with seal 24l pressed against valve seat 24g.

Referring to FIG. 5A, when liquid fuel is introduced under pressure through the filler pipe into upper plug portion 24b, it forces valve element 24j against spring 24k toward end plate 24h, opening a flow path across valve seat 24g and around valve element 24j through radial vents 24f. The rounded, cone-shaped flow pilot 24n directs flow around the outside of valve element 24j toward the radial vents to reduce turbulence and to generally assist flow through the check valve. As long as the force of fuel against valve element 24j is greater than the force exerted by spring 24k and the pressure in the fuel tank, check valve 24 remains in the open position of FIG. 5A.

To prevent valve element 24j from being held open by the suction effect of liquid fuel flowing through radial vents 24f at the lower end of check valve 24, hole 24i formed in end plate 24h eliminates such suction effects by providing a make-up pressure to the lower side of valve element 24j.

The foregoing illustrative embodiments of a system and individual valves according to the present invention are exemplary in nature, and the invention is not to be limited except as provided in the following claims. The invention claimed is:

We claim:

1. A fuel level responsive control valve for controlling the venting of fuel vapor from a vehicle fuel tank to a vapor canister during refueling in a manner providing a shutoff cue to a person filling the tank, the control valve comprising:

a valve adapted for venting fuel vapor from the tank to the canister at a first higher rate when the fuel level is below an initial refueling shutoff level, at a second lower rate when the fuel level reaches the initial refueling shutoff level such that a shutoff-inducing pressure increase is temporarily created in the tank, and for closing when a higher maximum refueling shutoff level is reached.

2. The control valve of claim 1, wherein the control valve comprises a fuel level responsive float.

3. The control valve of claim 2, wherein the control valve further comprises primary and secondary valve elements operated by the float, such that the float serially places the primary and secondary valve elements in positions which first partially and then fully close the control valve.

4. The control valve of claim 3, wherein the control valve includes a main vent outlet engaged by the primary valve element at the initial refueling shutoff level to partially close the control valve, and the primary valve element includes a secondary vent passage in vapor communication with the main vent outlet when the main vent outlet is engaged by the primary valve element, the secondary vent passage being closed by the secondary valve element at the maximum refueling shutoff level.

5. The control valve of claim 3, wherein the control valve includes a main vent outlet and a secondary vent outlet, the primary valve element being associated with the main vent outlet to close the main vent outlet at the initial refueling shutoff level, and the secondary valve element being associated with the secondary vent outlet to close the secondary vent outlet at the maximum refueling shutoff level.

6. The control valve of claim 2 wherein the control valve comprises a single fuel level responsive float operatively connected to primary and secondary valve elements to serially place the primary and secondary valve elements in partially closed and fully closed positions, respectively, as fuel level rises to the initial and maximum refueling shutoff levels, respectively.

7. The control valve of claim 6 wherein the primary and secondary valve elements are in coaxial alignment on the float.

8. The control valve of claim 7, wherein the control valve includes a main vent outlet aligned with the valve elements.

9. The control valve of claim 6 wherein the primary and secondary valve elements are radially offset.

10. The control valve of claim 9, wherein the control valve includes a primary vent outlet aligned with the primary valve element, and a secondary vent outlet aligned with the secondary valve element.

11. A fuel level responsive control valve for controlling the venting of fuel vapor from a vehicle fuel tank to a vapor canister during refueling in a manner providing a shutoff cue to a person filling the tank, the control valve comprising:

fuel level responsive primary and secondary valve elements in the control valve, wherein the primary valve element is adapted to be placed in a position partially closing fuel vapor venting through the control valve by an approximate full refueling fuel level such that a shutoff-inducing pressure increase is temporarily created in the fuel tank, and wherein the secondary valve element is adapted to be placed in a position fully closing fuel vapor venting through the control valve at a maximum refueling fuel level above the approximate full refueling level.

12. The control valve of claim 11 wherein the control valve comprises a single fuel level responsive float.

13. The control valve of claim 11, wherein the control valve includes a main vent outlet engaged by the primary valve element at the initial refueling shutoff level to partially close the control valve, and the primary valve element includes a secondary vent passage in vapor communication with the main vent outlet when the main vent outlet is engaged by the primary valve element, the secondary vent passage being closed by the secondary valve element at the maximum refueling shutoff level.

14. The control valve of claim 11, wherein the control valve includes a main vent outlet engaged by the primary valve element at the initial refueling shutoff level to partially close the control valve, and a secondary vent outlet engaged by the secondary valve element at the maximum refueling shutoff level to fully close the control valve.

15. A method for controlling the venting of fuel vapor from a vehicle fuel tank through a control valve in the tank to a vapor recovery apparatus during refueling in a manner providing a shutoff cue to a person filling the tank, the method comprising the following steps:

venting fuel vapor from the tank through the control valve to the vapor recovery apparatus at a first higher rate when the fuel level is below an approximate full refueling level, partially closing the control valve when the fuel level reaches the approximate full refueling level such that fuel vapor is vented at a second lower rate which triggers a temporary shutoff-inducing pressure increase in the tank, and fully closing the control valve when a higher maximum refueling fuel level is reached.

16. The method of claim 15, further comprising the steps of venting fuel vapor through a main vent outlet in the control valve at the first higher rate when the fuel level is below the approximate full refueling level, partially closing the main vent outlet with a float-operated primary valve element when the approximate full refueling level is reached, venting fuel vapor at the second lower rate through the partially closed main vent outlet past the primary valve element, and fully closing the main vent outlet with a float-operated secondary valve element when the maximum refueling fuel level is reached.

17. The method of claim 15, further comprising the steps of venting fuel vapor through primary and secondary vent outlets in the control valve at the first higher rate when the fuel level is below the approximate full refueling level, closing the primary vent outlet with a float-operated primary valve element when the approximate full refueling level is reached, venting fuel vapor at the second lower rate through the secondary vent outlet while the primary vent outlet is closed, and closing the secondary vent outlet with a float-operated secondary valve element when the maximum refueling fuel level is reached.

* * * * *